UNITED STATES PATENT OFFICE.

ALBERT C. HOLZAPFEL, OF NEW YORK, N. Y.

PAINT.

1,393,220.     Specification of Letters Patent.     Patented Oct. 11, 1921.

No Drawing.     Application filed May 20, 1921. Serial No. 471,191.

*To all whom it may concern:*

Be it known that I, ALBERT C. HOLZAPFEL, a citizen of the United States, residing at New York, in the county of New York and State of New York, have invented certain new and useful Improvements in Paints, of which the following is a specification.

This invention relates to paints, and more particularly to acid proof paints.

In the present invention, I employ an acid proof pigment and an acid proof vehicle to produce a perfect acid proof paint.

In the prior art, in the manufacture of acid proof paints, it has been customary to employ a vehicle which is entirely acid proof. The manufacture of a paint employing a pigment which is not entirely acid proof, even though the vehicle used in connection therewith is entirely acid proof, does not produce a satisfactory paint.

I have found that when an entirely acid proof pigment and an entirely acid proof vehicle are employed in combination with each other a perfect acid proof paint is produced.

While various acid proof vehicles may be employed, the use of a small portion of rubber in a hydrocarbon produces a vehicle of the proper consistency which is entirely acid proof and which may be readily mixed with a suitable pigment. Other acid proof vehicles may be employed in place of the rubber solution.

While various acid proof pigments may be used, I have found that the best results are obtained when titanium oxid is employed in connection with the rubber solution.

The proportions in which the materials may be used and the method of mixing them will, of course, vary considerably under different conditions, and the consistency of the paint to be made, the nature of the hydrocarbon employed and other essentials must be taken into consideration in the preparation of the paint.

As an illustrative embodiment of the invention, I dissolve about five parts of good quality rubber in ninety-five parts of hydrocarbon to produce a vehicle of the proper consistency. In place of rubber other acid proof gums and resins may be employed.

The titanium oxid is added to the rubber solution in the proportion of from thirty to fifty per cent. of the total mixture, producing a flat white paint which will withstand the attacks of concentrated sulfuric acid.

As stated, the proportions of rubber and hydrocarbon employed may vary according to the viscosity of the hydrocarbon and the nature of the rubber. Sufficient rubber is used to produce a vehicle of the desired consistency. The proportions of titanium oxid may also vary within wide limits, and while I have employed from thirty to fifty per cent. in given instances, the use of a larger or smaller percentage is at times desirable to produce a paint of a desired consistency.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

Having thus described my invention, I claim:

1. An acid proof paint comprising a pigment of titanium oxid and an acid proof vehicle.

2. An acid proof paint comprising a vehicle including a rubber solution and a pigment including titanium oxid.

3. An acid proof paint comprising a rubber solution and titanium oxid, the titanium oxid being present in less than fifty per cent. of the entire mixture.

4. The method of making an acid proof paint which comprises dissolving substantially five parts of rubber in ninety-five parts of a suitable hydrocarbon and adding sufficient titanium oxid thereto to produce a paint of the desired consistency.

In testimony whereof I affix my signature in presence of two witnesses.

ALBERT C. HOLZAPFEL.

Witnesses:
   ELIZABETH E. MITCHELL,
   JOSEPH A. SMITH.